United States Patent [19]

Martinez et al.

[11] 4,108,579
[45] Aug. 22, 1978

[54] WAVE MOTOR

[76] Inventors: Antero Martinez; Estrella Martinez, both of P.O. Box 1631, Santo Domingo, Dominican Republic

[21] Appl. No.: 731,566

[22] Filed: Oct. 12, 1976

[51] Int. Cl.[2] .................. F04B 17/00; F04B 35/00
[52] U.S. Cl. ................................ 417/333; 290/42; 60/496; 60/499; 60/503
[58] Field of Search ............ 417/330, 331, 333, 334; 60/496, 499, 503; 290/42

[56] References Cited

U.S. PATENT DOCUMENTS

| 840,460 | 1/1907 | Starr | 417/331 |
|---|---|---|---|
| 986,740 | 3/1911 | Mobius | 60/499 |
| 1,716,751 | 6/1929 | Avakian | 417/333 |
| 1,930,958 | 10/1933 | Parsons | 417/332 |
| 3,487,228 | 12/1969 | Kriegel | 417/331 X |
| 3,957,398 | 5/1976 | Lloyd | 417/331 |
| 3,970,415 | 7/1976 | Widecrantz et al. | 60/496 |

Primary Examiner—Carlton R. Croyle
Assistant Examiner—R. E. Gluck
Attorney, Agent, or Firm—Clarence A. O'Brien; Harvey B. Jacobson

[57] ABSTRACT

A basin for containing water is provided and a heavy buoyant body is guidingly received in the basin for back and forth reciprocal movement therein and also raising and lowering within the basin in response to changes in the elevation of the water level therein. One end of the basin opens toward and in opposition to a source of wave movement and the body is drivingly connected to a rotary output shaft to be driven in response to back and forth reciprocal movement of the body. The output shaft includes eccentric crankpin portions and connecting rods operably connect the reciprocal body to the crankpin portions of the output shaft. The basin opens toward the source of wave movement through a straight channel having a wave modulating gate operatively associated therewith.

12 Claims, 8 Drawing Figures

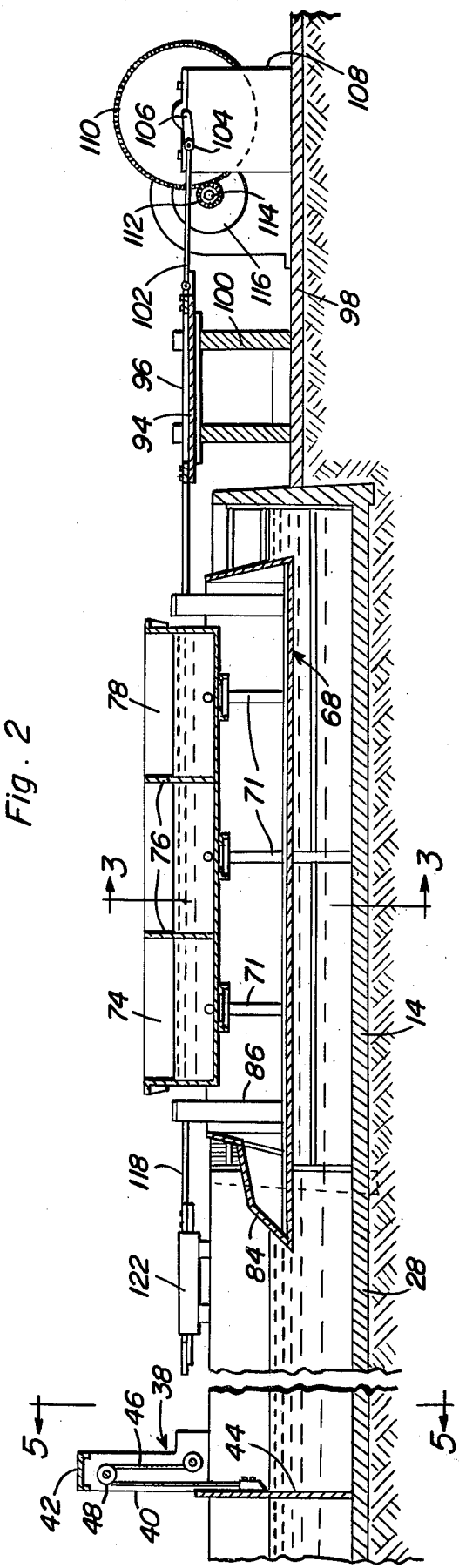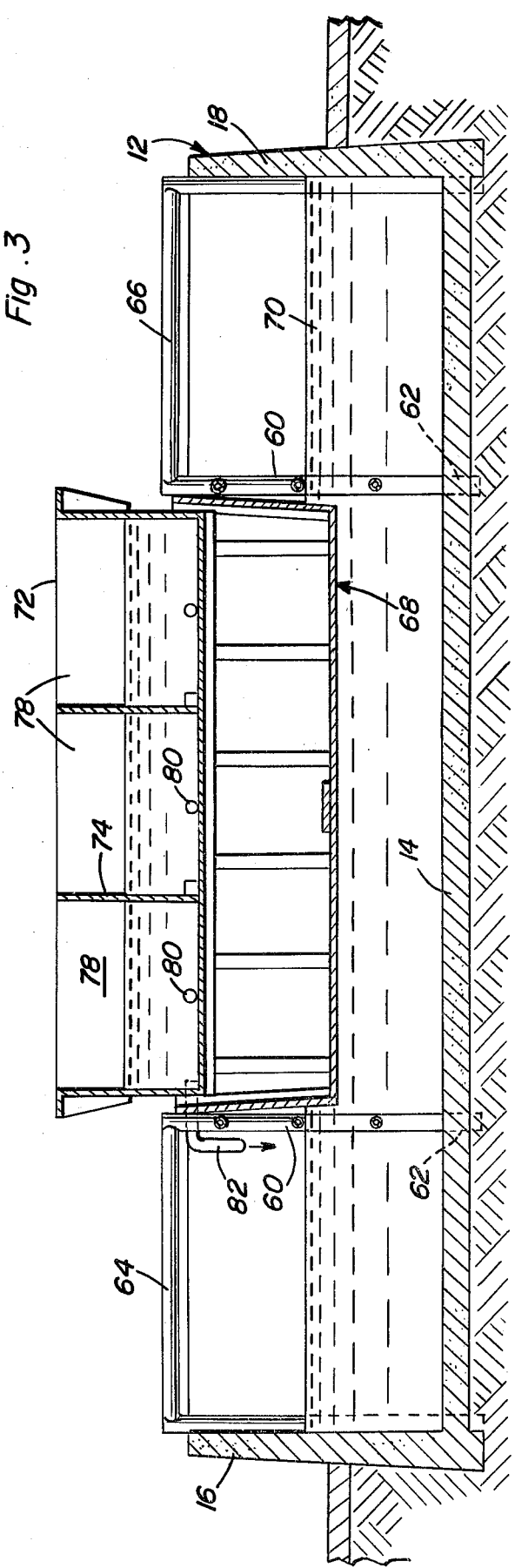

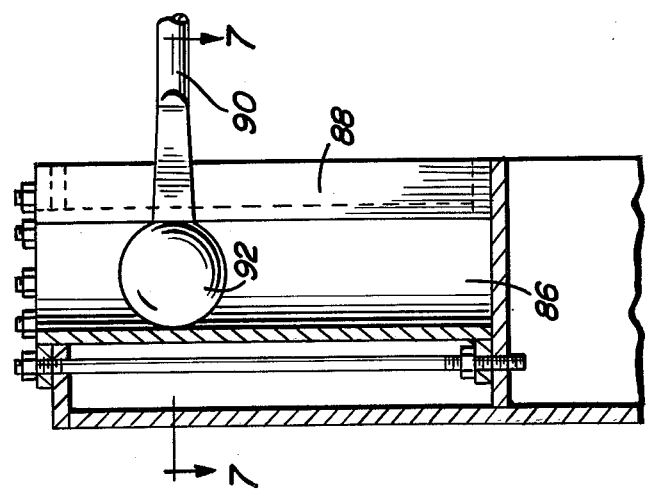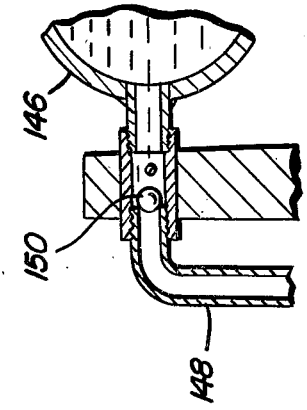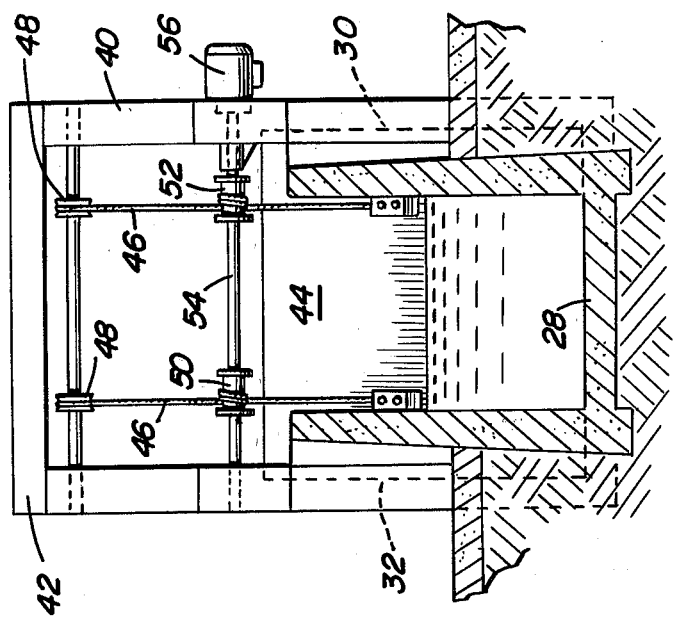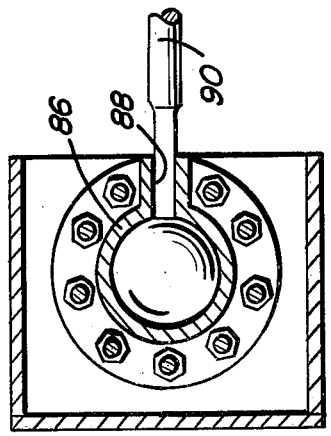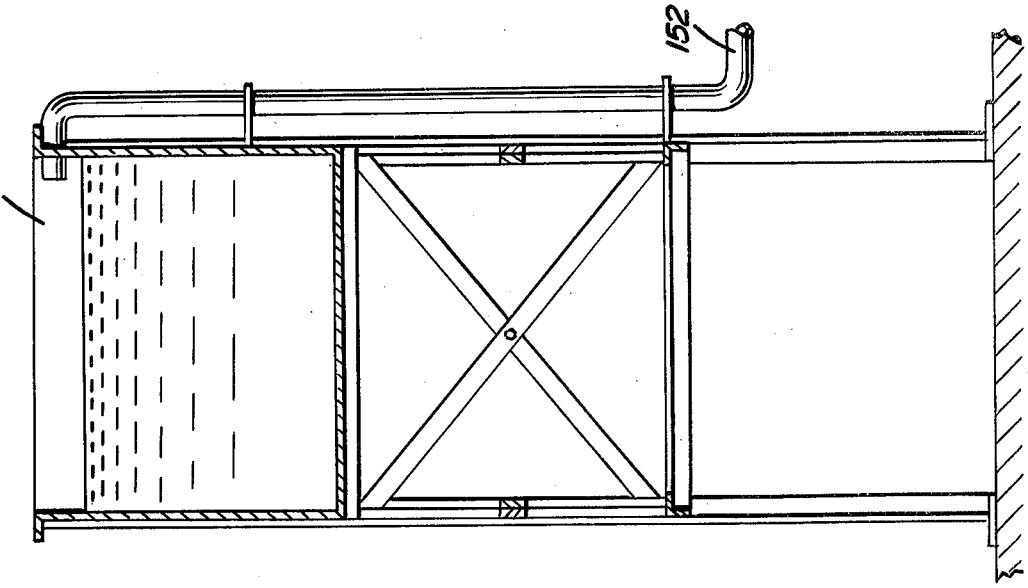

WAVE MOTOR

BACKGROUND OF THE INVENTION

Various forms of wave motors have been heretofore designed including buoyant bodies supported for guided up and down or back and forth movement and operable to convert the forces of waves into mechanical energy. However, most of these previously known structures have been inefficient in operation, extremely expensive to construct and maintain and capable of providing only very limited control of the forces of waves to which they are subject. Accordingly, a need exists for an efficient wave motor constructed in a manner whereby the forces of waves capable of acting upon the wave motor may be modulated so as to be maintained below predetermined maximum levels.

Examples of wave motors utilizing some of the general structural and operational features of the instant invention are disclosed in U.S. Pat. Nos. 562,317, 1,140,521, 1,617,568, 1,930,958, 2,820,148 and 3,567,953.

BRIEF DESCRIPTION OF THE INVENTION

The wave motor of the instant invention includes a buoyant body guidingly mounted within a basin opening toward and in opposition to a source of wave action. The body is received within the basin for up and down movement therein in response to variations in the level of water within the basin and also back and forth movement within the basin toward and away from the source of wave action. In addition, the basin opens toward the source of wave action through an elongated channel having a wave modulating gate operatively associated therewith whereby the forces of wave action acting upon the buoyant body may be maintained below a predetermined maximum.

The main object of this invention is to provide a wave motor constructed in a manner so as to efficiently convert the forces of wave action into rotary torque.

Another object of this invention, in accordance with the immediately preceding object, is to provide a wave motor constructed in a manner whereby the wave motor may be operated over extended periods of time with only a reasonable amount of maintenance required.

Another important object of this invention is to provide a wave motor including structure whereby the maximum forces of waves acting thereon may be adjustably modulated.

A further object of this invention is to provide a wave motor including various adjustments therefor adapting the motor for use in conjunction with various size waves and waves which occur with greater or lesser frequency.

A final object of this invention to be specifically enumerated herein is to provide a wave motor which will conform to conventional forms of manufacture, be of simple construction and easy to control so as to provide a device that will be economically feasible, long lasting and adaptable to various operating conditions.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a fragmentary enlarged vertical sectional view taken substantially upon the plane indicated by the section line 2—2 of FIG. 1;

FIG. 3 is an enlarged transverse vertical sectional view taken substantially upon the plane indicated by the section line 3—3 of FIG. 2;

FIG. 4 is an enlarged transverse vertical sectional view taken substantially upon the plane indicated by the section line 4—4 of FIG. 1;

FIG. 5 is an enlarged fragmentary vertical sectional view taken substantially upon the plane indicated by the section line 5—5 of FIG. 2;

FIG. 6 is an enlarged fragmentary vertical sectional view taken substantially upon the plane indicated by the section line 6—6 of FIG. 1;

FIG. 7 is a fragmentary horizontal sectional view taken substantially upon the plane indicated by the section line 7—7 of FIG. 6; and FIG. 8 is an enlarged fragmentary transverse vertical sectional view illustrating the check valve structure in the intake pipe for the reciprocating piston pump portion of the invention.

DETAILED DESCRIPTION OF THE INVENTION

Figure 1:
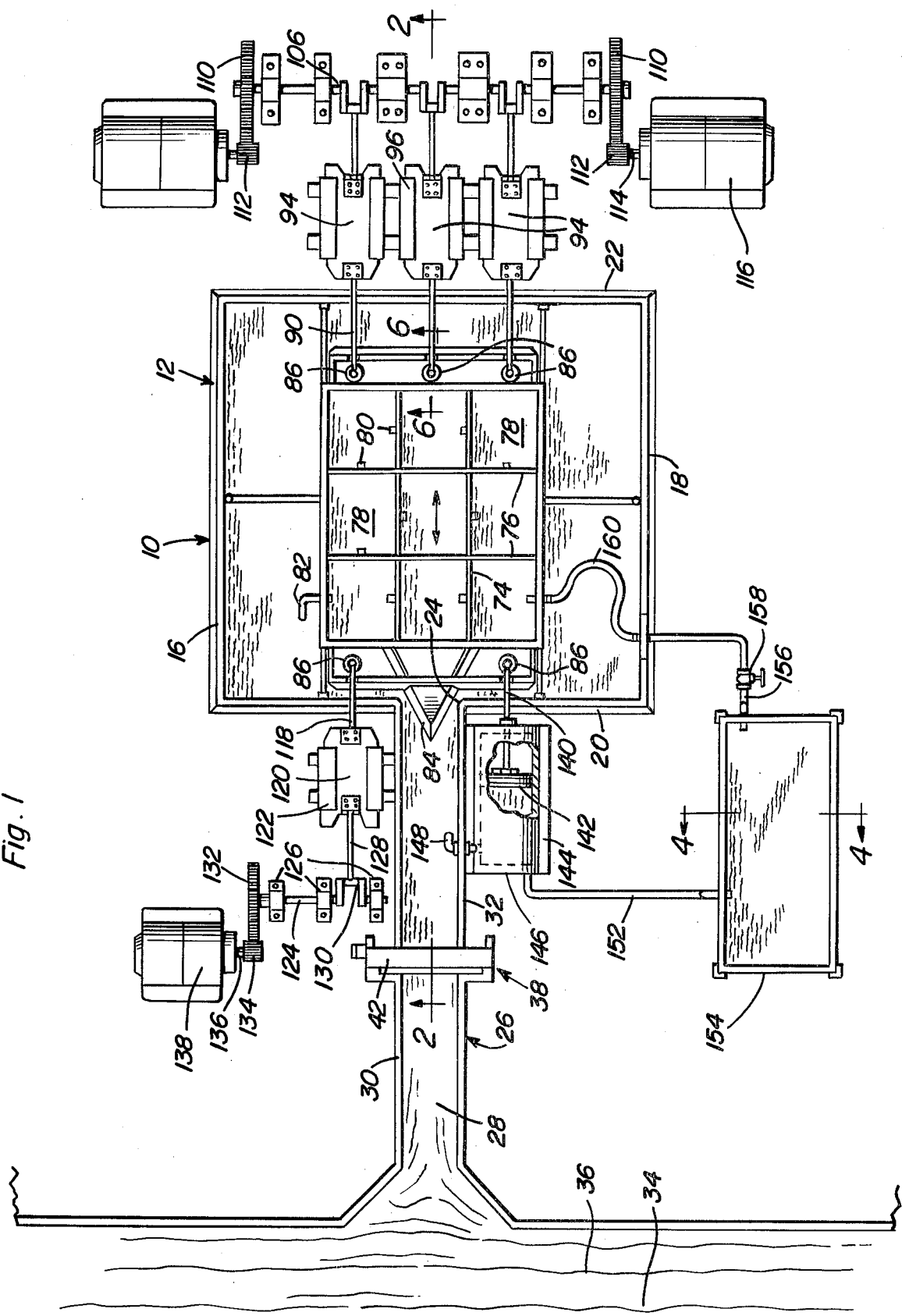
FIG. 1 is a top plan view of the wave motor of the instant invention.

Referring now more specifically to the drawings, the numeral 10 generally designates the wave motor of the instant invention. The motor 10 includes a partially ground-embedded basin referred to in general by the reference numeral 12 having a bottom wall 14, opposite side walls 16 and 18 and front and rear walls 20 and 22. The front wall 20 has a vertically extending opening 24 formed therein and the rear end of an entrance channel referred to in general by the reference numeral 26 opens into the basin through the opening 24. The channel 26 includes a bottom 28 comprising a forward continuation of the bottom wall 14 and opposite side walls 30 and 32. The forward end of the channel 26 opens outwardly toward a source 34 of waves 36 moving toward the entrance of the channel 26.

An intermediate portion of the channel 26 includes a wave modulating gate structure referred to in general by the reference numeral 38 and the structure 38 includes a support 40 projecting upwardly from opposite sides of the channel 26 and including an upper horizontal transverse bridging portion 42. A gate member 44 is guidingly supported from the support 40 for vertical movement relative thereto and a pair of opposite side lifting cables 46 are connected at one pair of corresponding ends to the gate member 44, trained over pulleys 48 carried by the support 40 and attached to a pair of winding members 50 and 52 at their other pair of ends, the winding members 52 being mounted on opposite end portions of a winding shaft 54 journaled between the opposite side portions of the support 40 and driven, reversibly, by a gear reduction motor 56 supported from one side of the support 40.

Mounted within opposite side portions of the basin 12 are a pair of upstanding front to rear extending tubular fence-type guide structures 60 secured to the bottom 14 as at 62 and braced relative to the side walls 16 and 18 as at 64 and 66. An upwardly opening hollow buoyant body referred to in general by the reference numeral 68 is floated in the water 70 within the basin 12 between the guide structures 60 and the body 68 includes a plurality of transversely extending and longitudinally spaced upstanding supports 71 from which a multi-compartment open top tank 72 is supported. The tank 72 includes longitudinal and transverse dividers 74 and 76 dividing the interior of the tank 72 into individual compartments 78 and a plurality of pipes 80 are secured through lower portions of the partitions 74 and 76 for establishing limited communication between the compartments 78.

One of the compartments 78 includes a drain 82 for draining the water from the tank 72 into the basin 12 and the drain 82 may be provided with a valve if desired.

The forward portion of the body 68 defines a pointed bow or prow 84 for breaking up and thus cushioning the initial impact of waves moving rearwardly through the channel 26 and impacting with the body 68. Also, the forward end of the body 68 includes a pair of opposite side vertically extending guides 86 while the rear end of the body 68 includes three transversely spaced vertical guides 86. From FIGS. 7 and 8 of the drawings it will be seen that each of the guides 86 comprises a substantially cylindrical guide having a vertically extending slot 88 opening thereinto and three thrust rods 90 are equipped with substantially spherical follower members 92 on one set of corresponding ends thereof guidingly received in the guides 86. The other ends of the thrust rods 90 are attached to guide plates 94 guidingly supported from guide structures 96 supported from a rear apron 98 of the wave motor 10 by means of support structures 100 and each of the guide plates 96 has one end of a connecting rod 102 pivotally connected thereto, the remote ends of the connecting rods 102 being journaled on crankpins 104 of a crankshaft 106 journaled from supports 108 also supported from the apron 98. The opposite ends of the shaft 106 have large diameter gear wheels 110 mounted thereon and the gear wheels 110 are meshed with smaller gear wheels 112 mounted on input shaft portions 114 of electric generators 116. Thus, the body 68 is connected to the crankshaft 106 for imparting rotary movement thereto in response to back and forth reciprocation of the body 68 within the basin 12.

The right hand forward guide 86 has one end of a connecting rod 118 corresponding to the connecting rod 90 drivingly engaged therewith and the other end of the connecting rod 118 is anchored to a guide plate 120 corresponding to the guide plates 94 and supported from guides 122 corresponding to the guides 96. A second smaller crankshaft 124 is journaled from supports 126 forward of the right side of the basin 12 and a connecting rod 128 is pivotally connected between the guide plate 120 and the crankpin 130 of the crankshaft 124. One end of the crankshaft 124 has a large diameter gear wheel 132 mounted thereon and the gear wheel 132 is meshed with a smaller gear wheel 134 mounted on the input shaft portion 136 of a third generator 138. On the other hand, the left hand forward guide 86 has one end of a piston rod 140 guidingly engaged therewith and the other end of the piston rod 140 has a piston 142 mounted thereon reciprocal in the cylinder 144 of a water pump 146. The water pump 146 includes an inlet pipe 148 opening downwardly into the water within the channel 26 and equipped with a check valve 150. The pump 146 includes an outlet pipe 152 which opens into the upper portion of an elevated tank 154 from which water may be drawn by gravity through a discharge line 156 having a control valve 158 serially connected therein. The discharge line 156 opens into the interior of one of the compartments 78 through a flexible hose 160.

It is to be noted that the spherical ends 92 of the shafts or rods 90, 118 and 140 may slide freely up and down within the corresponding guides 86 as the body 68 lowers and rises in the basin 12. Accordingly, the rods 90, 118 and 140 are maintained at the same level.

In operation, the gate member 44 may be raised and lowered to modulate the waves 36 entering the channel 26 and moving rearwardly therethrough toward the prow 84 of the body 68. However, as a wave moving rearwardly through the channel 26 strikes the prow 84 and the forward end of the body 68 the body 68 is moved rearwardly between the guide structures 60 and thus pushes rearwardly on the rods 90 and pulls rearwardly on the rods 118 and 140. As the body 68 moves back and forth within the basin 12 the crankshaft 106 and the crankshaft 124 are rotated thereby driving the generators 116 and 138. In addition, the piston 142 is reciprocated in the cylinder 144 and water is pumped from the channel 26 into the tank 154. As desired, water is fed, by gravity, through the valve 158 and into one of the compartments 78, the pipes 80 allowing the water within the tank 72 to seek the same level in each of the compartments 78. The buoyancy of the body 68 is controlled by the amount of water within the tank 72 and thus a given height wave may exert a variable amount of force on the body 68, depending upon the level of the latter in the water 70 as determined by the amount of water within the tank 72. In addition, the force of waves passing rearwardly through the channel 26 may be modulated by the gate member 44 and the various longitudinal and transverse partitions 74 and 76 within the tank 72 prevent uncontrolled shifting of water within the tank 72.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a basin, one side of said basin opening toward and in opposition to a source of waves moving theretoward, a buoyant body mounted within the basin for guided reciprocal movement therein toward and away from said one side and for vertical shifting in said basin during said reciprocal movement, a rotary shaft member journaled for rotation about a fixed axis, and drive means operatively connecting said body to said shaft member for driving the latter in response to reciprocation of said body in said basin, said body including at least one upstanding guide on the side thereof remote from said one side of said basin, said drive means including an elongated horizontal drive member, one end of said drive member including follower means captively engaged with said guide for relative vertical shifting between said guide and follower means, stationary horizontal guide means, the other end of said drive member being guidingly engaged with said guide means for horizontal shifting relative thereto, and pitman means drivingly connecting said drive member to said shaft.

2. In combination, a basin, one side of said basin opening toward and in opposition to a source of waves moving theretoward, a buoyant body mounted within the basin for guided reciprocal movement therein toward and away from said on side and for independent vertical shifting in said basin during said reciprocal movement, a rotary shaft member journaled for rotation about a fixed axis, and drive means operatively connecting said body to said shaft member for driving the latter in response to reciprocation of said body in said basin, said body including means for varying the weight thereof and thus the level at which said body floats in said basin, means defining an entrance channel extending between said source and said basin and opening into the latter in a direction paralleling the path of guided reciprocation of said body and said basin, wave modulating gate means operatively associated with said channel operative to limit the height of the crests of waves passing through said channel and into said basin.

3. The combination of claim 1 including defining an entrance channel extending between said source and said basin and opening into the latter in a direction paralleling the path of guided reciprocation of said body in said basin.

4. The combination of claim 3 including wave modulating gate means operatively associated with said channel operative to limit the height of the crests of the waves passing through said channel and into said basin.

5. The combination of claim 4 wherein said body includes means for varying the weight thereof and thus the level at which said body floats in said basin.

6. The combination of claim 3 wherein said body includes means for varying the weight thereof and thus the level at which said body floats in said basin, said means for varying the weight of said body including a water tank supported from said body for receiving varying amounts of water therein.

7. The combination of claim 6 including a water pump, a second water tank, means drivingly connecting said body to said pump for driving the latter in response to reciprocation of said body, and means operative to variably convey water from said tank to the first mentioned tank.

8. The combination of claim 7 wherein said second tank is elevated above the first mentioned tank, said means operative to variably convey water from said second tank to said first tank includes a valve controlled gravity feed water line.

9. The combination of claim 3 wherein said body includes an outwardly projecting prow facing toward and aligned with said channel.

10. The combination of claim 1 wherein said body includes means for varying the weight thereof and thus the level at which said body floats in said basin.

11. The combination of claim 10 including means defining an entrance channel extending between said source and said basin and opening into the latter in a direction paralleling the path of guided reciprocation of said body in said basin.

12. The combination of claim 11 including wave modulating gate means operatively associated with said channel operative to limit the height of the crests of the waves passing through said channel and into said basin.

* * * * *